(12) United States Patent
Igarashi

(10) Patent No.: US 6,304,599 B1
(45) Date of Patent: Oct. 16, 2001

(54) ADAPTIVE EQUALIZER AND ADAPTIVE EQUALIZATION SCHEME

(75) Inventor: Hideki Igarashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/657,455

(22) Filed: Sep. 7, 2000

Related U.S. Application Data

(63) Continuation of application No. PCT/JP99/00258, filed on Jan. 22, 1999.

(51) Int. Cl.[7] ........................................ H03H 7/30
(52) U.S. Cl. .................... 375/232; 375/229; 375/230; 375/231
(58) Field of Search .................. 375/232, 229, 375/230, 231, 233, 144, 262, 341, 346, 348, 350; 329/318, 319, 321

(56) References Cited

U.S. PATENT DOCUMENTS

| | | | |
|---|---|---|---|
| 5,146,475 | 9/1992 | Kubo | 375/94 |
| 5,159,282 * | 10/1992 | Seizawa et al. | 329/316 |
| 5,283,531 * | 2/1994 | Serizawa et al. | 329/316 |
| 5,602,484 | 2/1997 | Suzuki et al. | 324/647 |
| 5,787,118 * | 7/1998 | Ueda | 375/232 |

OTHER PUBLICATIONS

Namekata et al., IEICE, B–281 (1990).
Fukawa et al., IEICE, B–258 (1992).

* cited by examiner

*Primary Examiner*—Stephen Chin
*Assistant Examiner*—Mohammad Ghayour

(57) ABSTRACT

An adaptive equalizer includes a channel memory length estimator (41) for estimating a channel memory length of a received signal, an adaptive equalizer (42) for reducing effect of intersymbol interference on the received signal using a technique suitable for a channel with a fast time-varying characteristic, an adaptive equalizer (43) for reducing effect of intersymbol interference on the received signal using a technique suitable for a channel with a large delay spread, and a selector for switching, in response to the channel memory length supplied from the channel memory length estimator (41), between the adaptive equalizer (42) suitable for the channel with the fast time-varying characteristic and the adaptive equalizer (43) suitable for the channel with the large delay spread, thereby implementing good bit error rate performance.

12 Claims, 5 Drawing Sheets

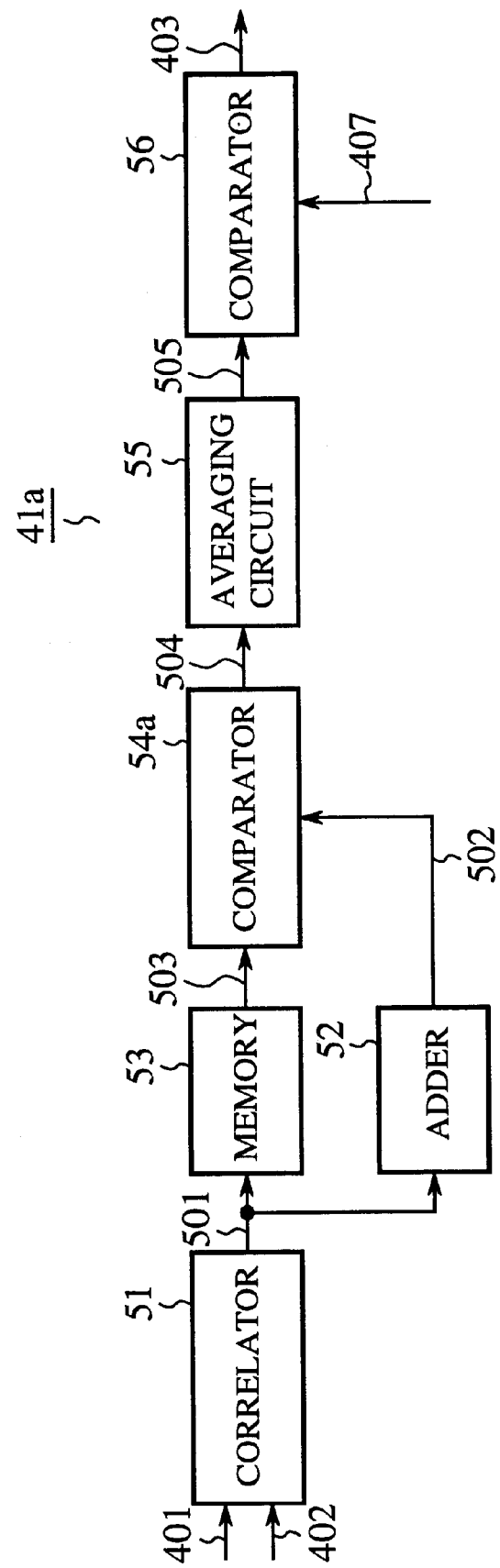

ADAPTIVE EQUALIZER AND ADAPTIVE EQUALIZATION SCHEME

CROSS-REFERENCE TO THE RELATED APPLICATION

This application is a continuation of International Application No. PCT/JP99/00258, whose international filing date is Jan. 22, 1999, the disclosures of which Application are incorporated by reference herein.

BACKGROUND OF THE INVENTION

1. Field of the Invention

The present invention relates to an adaptive equalizer and an adaptive equalization scheme, and particularly to an adaptive equalizer applicable to digital radio communication equipment in digital mobile communication, digital satellite communication, digital mobile-satellite communication and the like.

2. Description of Related Art

In digital mobile communication, fading—variations in the amplitude and phase of a received signal—can occur because of reflection, diffraction or scattering of radio waves due to geography and terrestrial materials around a mobile station. In particular, when the delay time of delay waves cannot be neglected as compared with a symbol length, the spectrum of a signal is distorted, resulting in large degradation.

Such fading is called frequency selective fading because the spectral distortion has frequency dependency. An adaptive equalizer is one of conventional effective techniques to overcome such fading.

As configurations of conventional adaptive equalizers, are known a decision feedback equalizer (referred to as DFE from now on) that eliminates the effect of delay waves by feeding back decision results, and a maximum likelihood sequence estimation (referred to as MLSE from now on) that selects a maximum likelihood sequence from among all the sequences having possibilities to be transmitted.

Although the MLSE is a little larger in size than the DFE, it has better performance than the DEE because it can utilize the power of the delay waves.

As for fading resulting from fast time variations in channel characteristics, the adaptive MLSE is more advantageous which carries out tracking following variations in the channel characteristics not only during training period that obtains channel impulse responses (called CIR from now on) from a known training sequence, but also during data sections.

In particular, the MLSE that carries out channel estimation for respective states of Viterbi algorithm (referred to as per-survivor processing MLSE from now on) exhibits good performance even for fast time-varying channels by carrying out the CIR estimation for respective states of the MLSE.

A configuration of a per-survivor processing MLSE will be described here as a typical conventional adaptive equalizer.

FIG. 1 is a block diagram showing a configuration of a conventional per-survivor processing MLSE disclosed in H. Kubo, K. Murakami and T. Fujino, "An Adaptive Maximum-Likelihood Sequence Estimator for Fast Time-Varying Intersymbol Interference Channels", IEEE Transactions on Communications, Vol. 42, Nos. 2/3/4, 1994, pp. 1872–1880 (called REF. 1 below). In this figure, the reference numeral 11 designates a maximum likelihood sequence estimating section; 12a–12n each designate a CIR estimator; 101 designates a received baseband signal; 102 designates estimated CIRs of respective states; 103 designates tentative decisions of respective states; and 104 designates hard decision data.

Next, the operation of the conventional device will be described.

The maximum likelihood sequence estimating section 11, receiving the received baseband signal 101 and estimated CIRs of respective states 102, estimates a transmitted sequence by Viterbi algorithm, and outputs its results as hard decision data 104.

FIG. 2 is a block diagram showing an internal configuration of the maximum likelihood sequence estimating section 11. In FIG. 2, the reference numeral 21 designates a branch metric generator; 22 designates an ACS (add-compare-select) operation circuit; 23 designates a path metric memory; 24 designates a path memory; 201 15 designates branch metrics; 202 designates path metrics; 203 designates path metrics at previous timing; and 204 designates a survivor path.

In the maximum likelihood sequence estimating section 11 within the conventional per-survivor processing MLSE with the foregoing configuration, a state $s_k$ and a path connected to a branch $s_k/s_{k-1}$ at time k of the Viterbi algorithm are defined by the following expressions (1) and (2).

$$s_k = [\tilde{I}_k, \tilde{I}_{k-1}, \ldots, \tilde{I}_{k-V+1}] \tag{1}$$

$$s_k/s_{k-1} = [\tilde{I}_k, \tilde{I}_{k-1}, \ldots, \tilde{I}_{k-V}] \tag{2}$$

where, $\tilde{I}_k$ is a candidates for the transmitted sequence determined by the state $s_k$ or by the branch $s_k/s_{k-1}$.

The branch metric generator 21 compares replicas of the received signal obtained from the estimated CIRs of respective states 102 with the received baseband signal 101, generates branch metrics 201 for all the branch candidates $s_k/s_{k-1}$, and supplies them to the ACS operation circuit 23.

Assuming that a metric criteria is a squared Euclidean distance, the branch metrics 201 can be expressed by the following expressions (3) and (4).

$$\Gamma_k[s_k/s_{k-1}] = |r_k \hat{r}_k[s_k/s_{k-1}]|^2 \tag{3}$$

$$\hat{r}_k[s_k/s_{k-1}] = \sum_{i=0}^{L} c_{i,k}[s_{k-1}]\tilde{I}_{k-i} \tag{4}$$

where, $\Gamma_k[s_k/s_{k-1}]$ is a branch metric 201 of the branch $s_k/s_{k-1}$, $r_k$ is the received baseband signal 101, $\hat{r}_k[s_k/s_{k-1}]$ is a replica of the received signal determined by the branch $s_k/s_{k-1}$, $c_{i,k}[s_{k-1}]$ is an estimated CIR 102 at the state $s_{k-1}$, and L is a channel memory length. The branch 15 metric generator 21 also outputs candidates $(\tilde{I}_k, \tilde{I}_{k-1}, \ldots, \tilde{I}_{k-V+1})$ of the transmitted sequence determined by the state $s_k$ as the tentative decisions of respective states 103 to be supplied to the CIR estimators 12a–12n.

The ACS operation circuit 22 adds the branch metrics 201 to the path metrics at previous timing 203 stored in the path metric memory 23 as the following expression (5) to obtain path metric candidates for all the branch candidates $s_k/s_{k-1}$.

$$H_k[s_k/s_{k-1}] = H_{k-1}[s_{k-1}] + \Gamma_k[s_k/s_{k-1}] \tag{5}$$

where $H_k[s_k/s_{k-1}]$ is the path metric candidate determined by the branch $s_k/s_{k-1}$, and $H_{k-1}[s_{k-1}]$ is a path metric at previous timing 203 determined by the state $s_{k-1}$. In addition, the ACS operation circuit 22 compares the path metric candidates $H_k[s_k/s_{k-1}]$ for each state $s_k$ as the following expression (6) to select a minimum path metric and supplies the minimum path metrics thus obtained to the path metric memory 23 as the path metrics 202.

$$H_k[s_k] = \min_{\{s_{k-1}\} \mapsto s_k} H_k[s_k/s_{k-1}] \qquad (6)$$

where, $H_k[s_k]$ is the path metric 202 determined by the state $s_k$. The ACS operation circuit 22 also supplies the path memory 24 with the information on the selected path as the survivor path 204.

The path memory 25 stores the survivor paths 204 for a predetermined time period, traces the paths whose path metrics at previous timing 203 are minimum, and outputs the transmitted sequence determined by the paths as the hard decision data 104.

Each of the CIR estimators 12a–12n which are prepared by the number of the states of the maximum likelihood sequence estimating section 11, receives the received baseband signal 101 and the tentative decision of respective states 103, estimates the CIR for respective states using the LMS (least mean square) algorithm, and outputs the estimated CIR of respective states 102. Specifically, as the following expression (7), the CIR estimators 12a–12n update all the estimated CIRs for all the states $s_k$ and channels i(i=0, . . . ,L) to be output as the estimated CIRs of respective states 102.

$$c_{i,k+1}[s_k] = c_{i,k}[s_{k-1}:s_k^{sv}] \delta(r_k c_{i,k}[s_{k-1}:s_k^{sv}] \tilde{I}_{k-i}) \tilde{I}^*_{k-i} \qquad (7)$$

where, $c_{i,k+1}[s_k]$ is the estimated CIR 102 at the state $s_k$, $c_{i,k}[s_{k-1}:s_k^{sv}]$ is the estimated CIR at the state $s_{k-1}$ on the transition of the survivor path to the state $s_k$, δ is a step size parameter, and •* designates a complex conjugate.

The per-survivor processing MLSE exhibits a good bit error rate performance for a fast time-varying channel by carrying out the foregoing per-survivor channel estimation.

On the other hand, an increasing number of states are required to implement the MLSE that can equalize the delay waves with long delay time on a channel with large delay spread, and this makes the device too bulky. In view of this, a list-output Viterbi equalizer using list-output Viterbi algorithm is proposed conventionally to restrain the device scale. The list-output Viterbi algorithm is disclosed in T. Hashimoto, "A List-Type Reduced-Constraint Generalization of the Viterbi Algorithm", IEEE Transactions on Information Theory, Vol. 33, No. 6, 1987, pp. 866–876 (called REF. 2 from now on). It generalizes the Viterbi algorithm by the following steps (a) and (b).

(a) Setting the memory length of the Viterbi algorithm smaller than the constraint length L of a channel or of a code; and (b) Increasing the number of survivor paths connected to respective states to S rather than one, where S is a positive integer.

The generalization concept (a) is the same as that of the decision feedback sequence estimation (DFSE). On the other hand, the generalization concept (b) is to select S paths with most likely metrics from among 2S connected paths in the case of binary transmission, for example.

The conventional list-output Viterbi equalizer using this list-output Viterbi algorithm can limit the degradation from a performance of the MLSE to a certain level with a rather small device size by leaving a plurality of survivor paths at respective states.

A configuration and operation of the list-output Viterbi equalizer will now be described as the second conventional example.

FIG. 3 is a block diagram showing a configuration of the conventional list-output Viterbi equalizer disclosed in the REF. 2, for example. In FIG. 3, the reference numeral 31 designates a branch metric generator; 32 designates an ACS operation circuit; 33 designates a path metric memory; 34 designates a path memory; 301 designates a received baseband signal; 302 designates an estimated CIR; 303 designates survivor paths connected to a state; 304 designates branch metrics; 305 designates path metrics; 306 designates path metrics at previous timing; 307 designates survivor paths; and 308 designates hard decision data.

Next, the operation of the second conventional device will be described.

Here, we define a u th path $s_k[u]$ connected to a state $s_k$ and a vth path $s_k/s_{k-1}[v]$ connected to a branch $s_k/s_{k-1}$ as the following expressions (8) and (9).

$$s_k[u] = [\tilde{I}_k, \tilde{I}_{k-1}, \ldots, \tilde{I}_{k-V-1}, \tilde{I}_{k-V}^{sv}, \ldots, \tilde{I}_{k-L}^{sv}, \ldots] \qquad (8)$$

$$s_k/s_{k-1}[v] = [\tilde{I}_k, \tilde{I}_{k-1}, \ldots \tilde{I}_{k-V}, \tilde{I}_{k-V-1}^{sv}, \ldots, \tilde{I}_{k-L}^{sv}, \ldots] \qquad (9)$$

where, $\tilde{I}_k^{sv}$ is a candidate of the transmitted sequence based on the uth or vth survivor path connected to the state $s_k$ or to the branch $s_k/s_{k-1}$.

The branch metric generator 31, receiving the received baseband signal 301, estimated CIR 302 and survivor paths 303 connected to the state, compares the received baseband signal 301 with the replicas of the received signal obtained from the estimated CIR 302 and survivor paths connected to the state, and generates the branch metrics 304 for all the branch candidates $s_k/s_{k-1}[v]$(v=1,2, . . . ,S) to be supplied to the ACS operation circuit 32. Using the squared Euclidean distance as a metric criteria, the branch metrics 304 can be expressed by the following equations (10) and (11).

$$\Gamma_k[s_k/s_{k-1}[v]] = |r_k - \hat{r}_k[s_k/s_{k-1}[v]]|^2 \qquad (10)$$

$$\hat{r}_k[s_k/s_{k-1}[v]] = \sum_{i=0}^{V} c_i \tilde{I}_{k-i} + \sum_{i=V+1}^{L} c_i \tilde{I}_{k-i}^{sv} \qquad (11)$$

where $\Gamma_k[s_k/s_{k-1}[v]]$ is the branch metric 304 of the branch $s_k/s_{k-1}[v]$, $r_k$ is the received baseband signal 301, $\hat{r}_k[s_k/s_{k-1}[v]]$ is the replica of the received signal determined by the branch $s_k/s_{k-1}[v]$, $c_i$ is the estimated CIR 302, L is the channel memory length, and V is the memory length of the Viterbi algorithm.

The ACS operation circuit 32 adds the branch metrics 304 to the path metrics at previous timing 306 stored in the path metric memory 33 as in expression (12), and calculates the path metric candidates for all the branch candidates $s_k/s_{k-1}[v]$(v=1,2, . . . ,S).

$$H_k[s_k/s_{k-1}[v]] = H_{k-1}[s_{k-1}[v]] + \Gamma_k[s_k/s_{k-1}[v]] \qquad (12)$$

where, $H_k[s_k/s_{k-1}[v]]$ is a path metric candidate determined by the branch $s_k/s_{k-1}[v]$, and $H_{k-1}[s_{k-1}[v]]$ is the path metric at previous timing 306 determined by the state $s_{k-1}[v]$. The ACS operation circuit 32 further carries out the processing as shown by the following equation (13) for each of all the states $s_k[u]$(u=1,2, . . . ,S) in all orders. Specifically, the ACS operation circuit 32 selects the uth smallest candidates from among the path metric candidates $H_k[s_k/s_{k-1}[v]]$ determined by the branch $s_k/s_{k-1}[v]$ connected to the state $s_k$, and supplies them to the path metric memory 33 as the path metrics 305.

$$H_k[s_k[u]] = \min_{\{s_{k-1}[v]\} \to s_k}^{u} H_k[s_k/s_{k-1}[v]] \qquad (13)$$

Here, $H_k[s_k[u]]$ is the path metric 305 determined by the state $s_k[u]$. The ACS operation circuit 32 also supplies the path memory 34 with the information on the selected paths as the survivor paths 307.

The path memory 34 stores the survivor paths 307 for a predetermined time period, traces the paths whose path metrics at previous timing 306 are smallest, and outputs the transmitted sequence determined by the paths as the hard decision data 308.

As described above, the conventional list-output Viterbi equalizer exhibits a good bit error rate performance in a considerable small size even for a channel with rather large delay spread by leaving a plurality of paths for each state. In addition, utilizing the diversity effect of the delay waves in the case of large delay spread, the adaptive configuration that also carries out the CIR estimation for data section can constrain the degradation in the bit error rate performance to some extent for a channel with fast time-varying fading.

However, the conventional per-survivor processing MLSE and list-output Viterbi equalizer with the foregoing configurations have the following problems. First, the per-survivor processing MLSE requires a considerably large device scale for a channel with large delay spread. Second, the list-output Viterbi equalizer degrades the bit error rate performance for a channel with small delay spread and fast time-varying fading.

The present invention is implemented to solve the foregoing problems. Therefore, an object of the present invention is to provide an adaptive equalizer and adaptive equalization scheme capable of achieving a good bit error rate performance for both the channel with large delay spread and the channel with small delay spread and fast time-varying fading.

SUMMARY OF THE INVENTION

An adaptive equalizer in accordance with the present invention comprises: a channel memory length estimator for estimating a channel memory length from a received signal; a first adaptive equalizer for reducing effect of intersymbol interference on the received signal using a technique suitable for a channel with a fast time-varying characteristic; a second adaptive equalizer for reducing effect of intersymbol interference on the received signal using a technique suitable for a channel with a large delay spread; and a selector for selecting, in response to the channel memory length supplied from the channel memory length estimator, one of demodulated data output from the first adaptive equalizer and from the second adaptive equalizer, and for outputting the selected demodulated data, thereby improving a bit error rate performance.

In the adaptive equalizer in accordance with the present invention, the first adaptive equalizer can consist of an adaptive equalizer that uses, as the technique suitable for the channel with the fast time-varying characteristic, maximum likelihood sequence estimation that carries out channel estimation for respective states to reduce the effect of the intersymbol interference on the received signal, and the second adaptive equalizer can consist of an adaptive equalizer that uses, as the technique suitable for the channel with the large delay spread, list-output Viterbi algorithm to reduce the effect of the intersymbol interference on the received signal.

In the adaptive equalizer in accordance with the present invention, the channel memory length estimator can receive the received signal and a known training sequence, calculate correlation between the received signal and the training sequence with shifting timing of the received signal, and estimate the channel memory length from correlation power obtained from the correlation.

In the adaptive equalizer in accordance with the present invention, the channel memory length estimator can receive the received signal and a known training sequence, calculate correlation between the received signal and the training sequence over several bursts with shifting timing of the received signal, and estimate the channel memory length based on probability that obtained correlation power exceeds a predetermined threshold.

An adaptive equalization scheme in accordance with the present invention comprises the steps of: estimating with a channel memory length estimator a channel memory length from a received signal captured by receiving a radio wave radiated from digital radio communication equipment; reducing with a first adaptive equalizer effect of intersymbol interference on the received signal using a technique suitable for a channel with a fast time-varying characteristic; reducing with a second adaptive equalizer effect of intersymbol interference on the received signal using a technique suitable for a channel with a large delay spread; selecting, in response to the channel memory length, one of demodulated data output from the first adaptive equalizer and from the second adaptive equalizer; and outputting the selected demodulated data.

In the adaptive equalization scheme in accordance with the present invention, the step of reducing with the first adaptive equalizer can use, as the technique suitable for the channel with the fast time-varying characteristic, maximum likelihood sequence estimation that carries out channel estimation for respective states to reduce the effect of the intersymbol interference on the received signal, and the step of reducing with the second adaptive equalizer can use, as the technique suitable for the channel with the large delay spread, list-output Viterbi algorithm to reduce the effect of the intersymbol interference on the received signal.

In the adaptive equalization scheme in accordance with the present invention, the step of estimating with the channel memory length estimator can receive the received signal and a known training sequence, calculate correlation between the received signal and the training sequence with shifting timing of the received signal, and estimate the channel memory length from correlation power obtained from the correlation.

In the adaptive equalization scheme in accordance with the present invention, the step of estimating with the channel memory length estimator can receive the received signal and a known training sequence, calculate correlation between the received signal and the training sequence over several bursts with shifting timing of the received signal, and estimate the channel memory length based on probability that obtained correlation power exceeds a predetermined threshold.

BRIEF DESCRIPTION OF THE DRAWINGS

FIG. 9 is a block diagram showing an internal configuration of the channel memory length estimator in the embodiment 2 in accordance with the present invention.

DETAILED DESCRIPTION OF THE PREFERRED EMBODIMENTS

The best mode for carrying out the present invention will now be described with reference to the accompanying drawings to explain the present invention in more detail.

Embodiment 1

Figure 4:
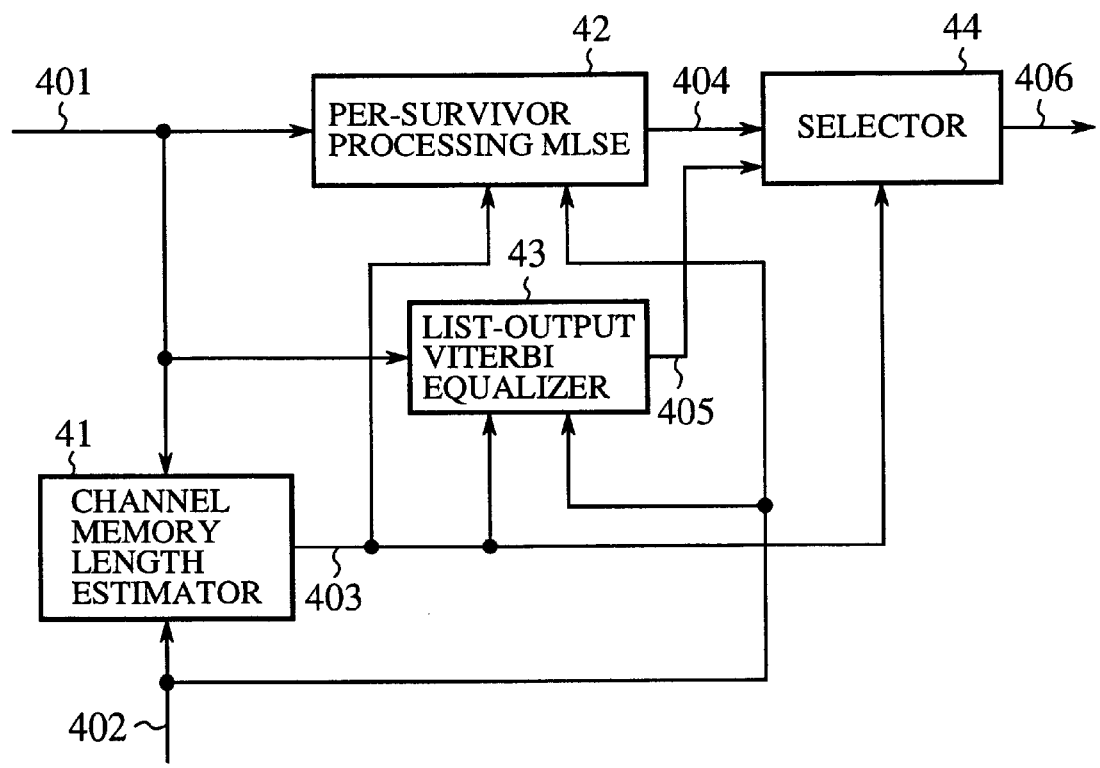
FIG. 4 is a block diagram showing a configuration of an adaptive equalizer of an embodiment 1 in accordance with the present invention.

FIG. 4 is a block diagram showing a configuration of an adaptive equalizer of an embodiment 1 in accordance with the present invention. In this figure, the reference numeral 41 designates a channel memory length estimator; 42 designates a per-survivor processing MLSE; 43 designates a list-output Viterbi equalizer; 44 designates a selector; 401 designates a received baseband signal; 402 designates a training sequence; 403 designates a channel memory length; and 404 and 405 each designate hard decision data. The reference numeral 406 designates hard decision data, that is, demodulated data, selected by the selector 44 from among the hard decision data 404 and 405 output from the per-survivor processing MLSE 42 and list-output Viterbi equalizer 43.

Next, the operation of the present embodiment 1 will be described.

Figure 5:
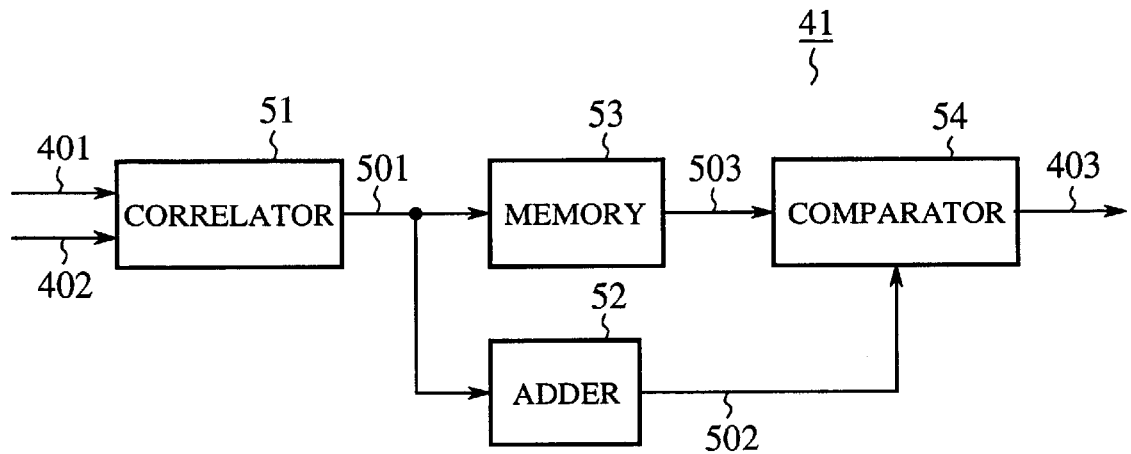
FIG. 5 is a block diagram showing an internal configuration of the channel memory length estimator in the embodiment 1 in accordance with the present invention.

The channel memory length estimator 41, receiving the received baseband signal 401 and known training sequence 402, obtains the correlation between the received baseband signal 401 and the training sequence 402, estimates the channel memory length 403 and outputs estimated results. FIG. 5 is a block diagram showing an internal configuration of the channel memory length estimator 41. In this figure, the reference numeral 51 designates a correlator; 52 designates an adder; 53 designates a memory; 54 designates a comparator; 501 and 503 each designate correlation power; and 502 designates a sum of the correlation powers obtained by the adder 52.

In the channel memory length estimator 41 with the foregoing configuration, shifting the timing of the received baseband signal 401, the correlator 51 calculates the correlation between the received baseband signal 401 and the known training sequence 402 like a unique word, squares the correlation results, and supplies the squared values to the adder 52 and memory 53 as the correlation powers 501. The adder 52 adds the correlation powers for all the timings that the correlation is calculated, and supplies the sum 502 of the correlation powers to the comparator 54. The memory 53 temporarily stores the correlation powers at all the timings that the correlation is calculated, and supplies the stored correlation powers 503 to the comparator 54 after the adder 502 obtains the sum 502 of the correlation powers. The comparator 54 compares the correlation powers 503 with the sum 502 of the correlation powers, and outputs a timing width, in which the ratios of the correlation powers 503 to the sum 502 of the correlation powers are greater than a predetermined value, as the channel memory length 403.

The channel memory length estimator 41 supplies the channel memory length 403 to the per-survivor processing MLSE 42, list-output Viterbi equalizer 43 and selector 44.

The per-survivor processing MLSE 42, receiving the received baseband signal 401, the channel memory length 403 output from the channel memory length estimator 41 and the known training sequence 402, estimates the transmitted sequence using the maximum likelihood sequence estimation that carries out the channel estimation for respective states, and outputs the obtained values as the hard decision data 404.

Figure 1:
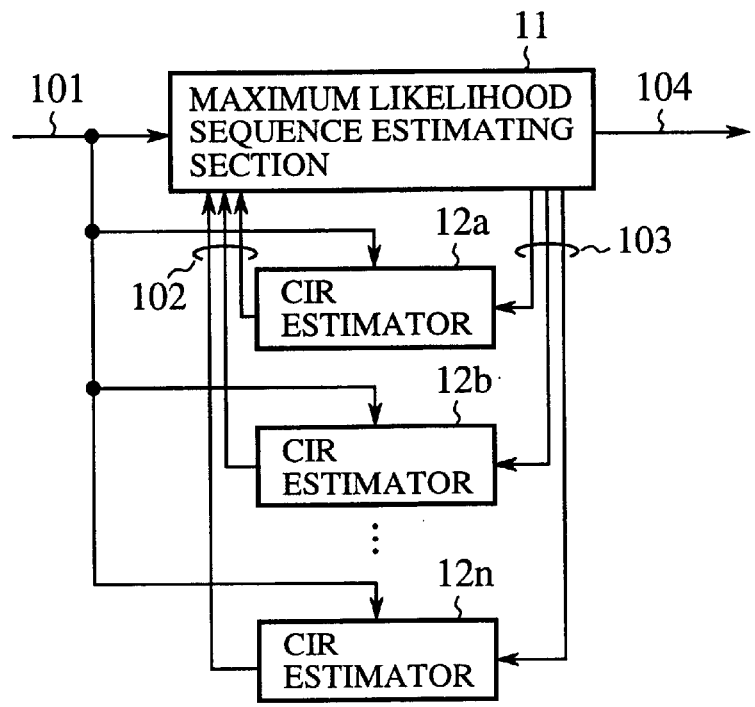
FIG. 1 is a block diagram showing a configuration of a conventional per-survivor processing MLSE.
Figure 6:
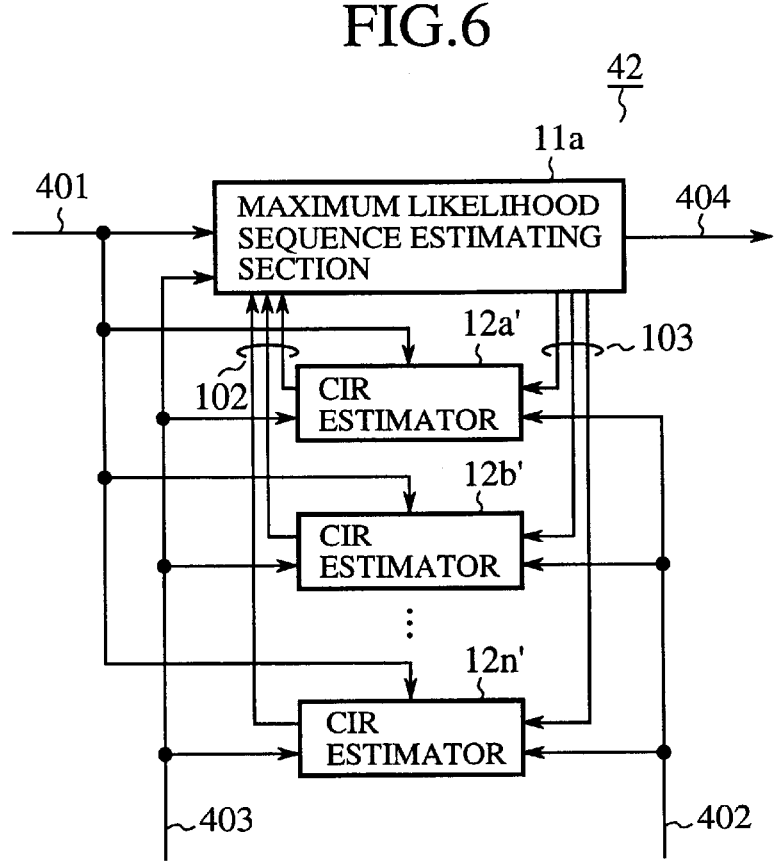
FIG. 6 is a block diagram showing an internal configuration of the per-survivor processing MLSE in the embodiment 1 in accordance with the present invention.

FIG. 6 is a block diagram showing an internal configuration of the per-survivor processing MLSE 42, in which the same reference numerals designate the same components as those of the conventional per-survivor processing MLSE as shown in FIG. 1, and the description thereof is omitted here.

The internal configuration of the per-survivor processing MLSE 42 of the present embodiment 1 differs from that of the conventional device as shown in FIG. 1 in that the channel memory length 403 is supplied to the maximum likelihood sequence estimating section 11a and to the CIR estimators $12a'–12n'$, and in that the training sequence 402 is supplied to the CIR estimators $12a'–12n'$.

Receiving the received baseband signal 401, estimated CIRs of respective states 102 and channel memory length 403, the per-survivor processing MLSE 42 in the adaptive equalizer of the present embodiment 1 with the foregoing configuration estimates the transmitted sequence by the Viterbi algorithm, and outputs the estimated results as the hard decision data 404.

Figure 2:
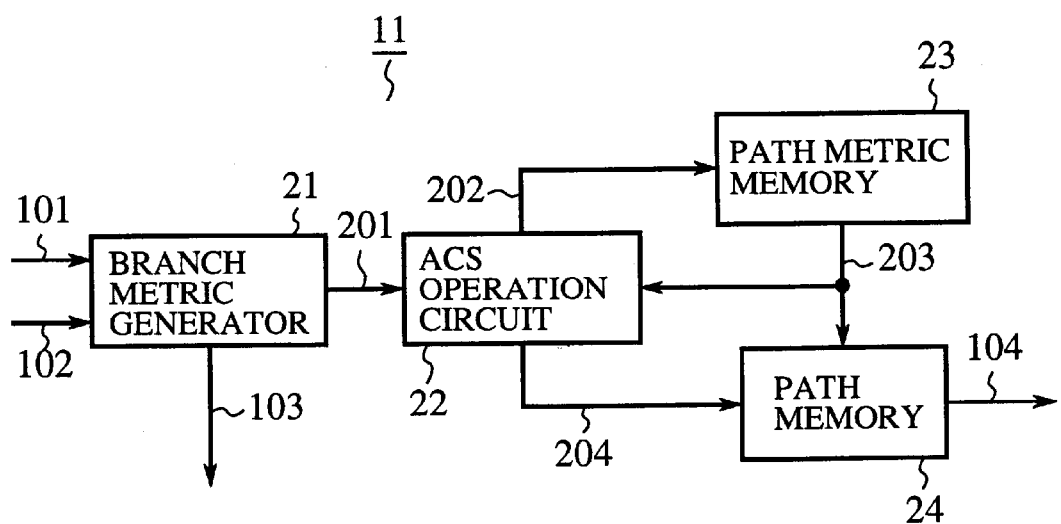
FIG. 2 is a block diagram showing an internal configuration of the maximum likelihood sequence estimating section in the conventional per-survivor processing MLSE.

The maximum likelihood sequence estimating section 11a of the per-survivor processing MLSE 42 in the adaptive equalizer of the present embodiment 1 differs from the maximum likelihood sequence estimating section 11 of the conventional per-survivor processing MLSE as shown in FIG. 2 in that the branch metric generator of the embodiment 1 operates in response to the channel memory length 403 supplied from the channel memory length estimator 41. In other words, the maximum likelihood sequence estimating section 11a of the present. embodiment 1 utilizes the channel memory length 403 as L of the foregoing expression (4).

Each of the n CIR estimators $12a'–12n'$ as shown in FIG. 6, receiving the received baseband signal 401, tentative decision of respective states 103, channel memory length 403 and training sequence 402, estimates the CIR for respective states using the IMS algorithm, and outputs the estimated CIR of respective states 102.

The CIR estimators $12a'–12n'$ of the present embodiment 1 differ from the CIR estimators $12a–12n$ of the conventional per-survivor processing MLSE in that they carry out the training operation using the known training sequence 402 in place of the tentative decisions of respective states 103, and that they use channel memory length 403 as L when updating the estimated CIRs 102 from i=0 to L in accordance with equation (7).

The list-output Viterbi equalizer 43 as shown in FIG. 4, receiving the received baseband signal 401, channel memory length 403 supplied from the channel memory length estimator 41 and known training sequence 402, estimates the transmitted sequence using the list-output Viterbi algorithm, and outputs the hard decision data 405.

Figure 3:
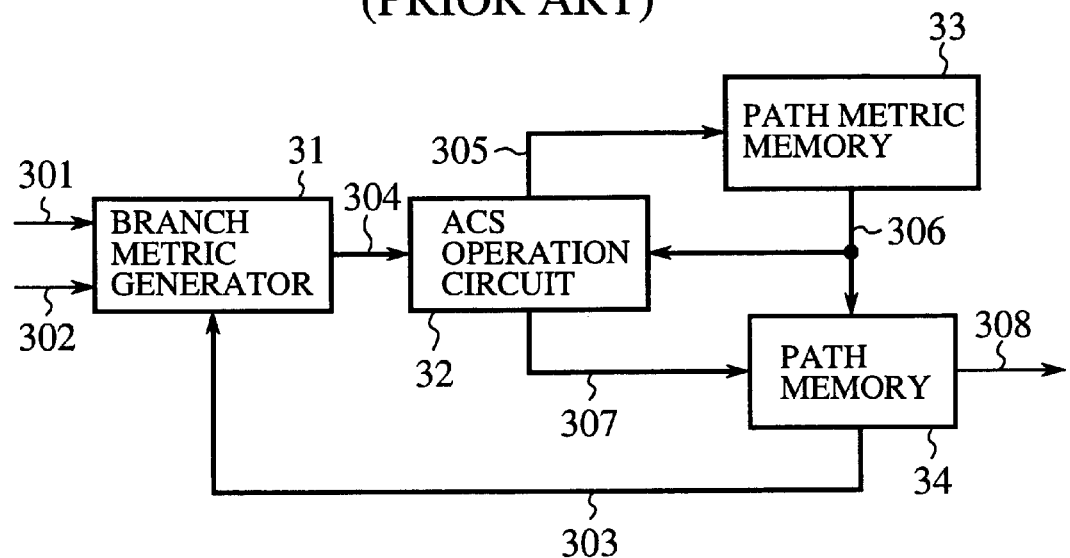
FIG. 3 is a block diagram showing a configuration of a conventional list-output Viterbi equalizer.
Figure 7:
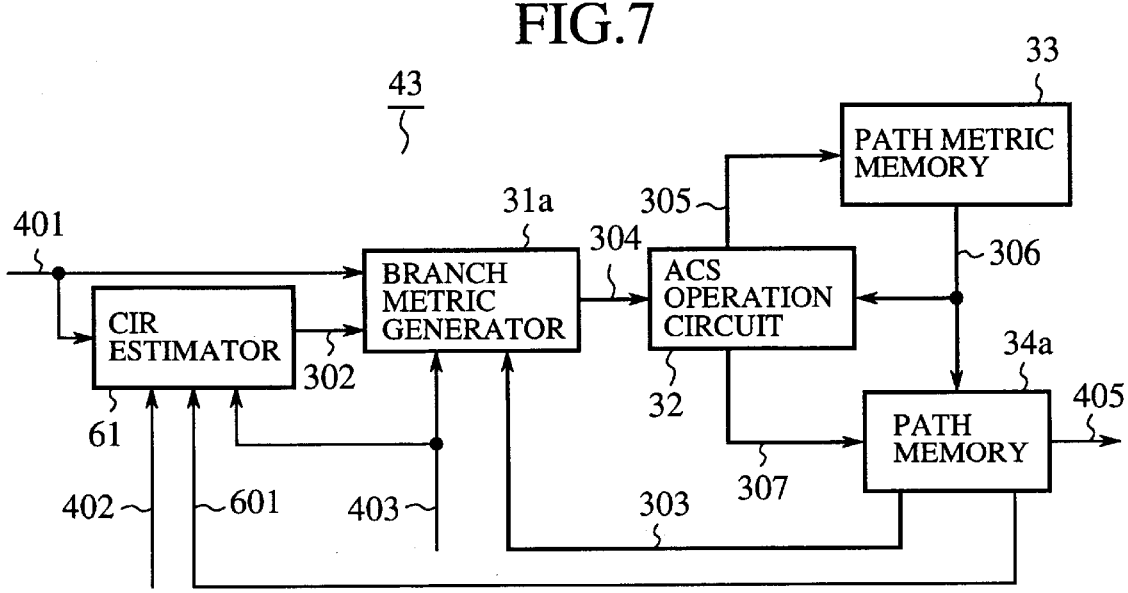
FIG. 7 is a block diagram showing an internal configuration of the list-output Viterbi equalizer in the embodiment 1 in accordance with the present invention.

FIG. 7 is a block diagram showing an internal configuration of the list-output Viterbi equalizer 43, in which the same reference numerals designate the same components as those of the conventional list-output Viterbi equalizer as shown in FIG. 3, and the description thereof is omitted here.

In FIG. 7, the reference numeral 61 designates a CIR estimator; 31a designates a branch metric generator; 34a designates a path memory; and 601 designates tentative decisions.

The CIR estimator 61 of the list-output Viterbi equalizer 43 in the adaptive equalizer of the present embodiment 1 with the foregoing configuration, receiving the received baseband signal 401, channel memory length 403, training sequence 402 and tentative decisions 601 fed from the path memory 34a, estimates the CIRs using the LMS algorithm, and outputs the estimated CIRs 302.

More specifically, it updates the estimated CIRs 302 with respect to the channel i(i=0, . . . ,L).

$$c_i = c_i \delta(r_k - c_i \hat{I}_{k-i}) \hat{I}^*_{k-i} \tag{14}$$

where $c_i$ is the estimated CIR 302, $r_k$ is the received baseband signal 401, $\delta$ is the step size parameter, and $\hat{I}_{k-i}$ is the tentative decision 601. As for the period of the known training sequence 402, the training operation is carried out using the training sequence 402 in place of the tentative decisions 601 as the $\hat{I}_{k-i}$ of equation (14).

The branch metric generator 31a generates the branch metrics 304 in accordance with the foregoing equations (10) and (11) in the same manner as the branch metric generator 31 of the conventional list-output Viterbi equalizer as shown in FIG. 3. The branch metric generator 31a in the adaptive equalizer of the present embodiment 1 differs from the branch metric generator 31 in the conventional list-output Viterbi equalizer as shown in FIG. 3 in that it uses as the L of equation (11) the channel memory length 403 fed from the channel memory length estimator 41.

The path memory 34a of the present embodiment 1 has, besides the functions of the path memory 34 of the conventional list-output Viterbi equalizer, a function to generate the tentative decisions 601 for the CIR estimator 61 to carry out the CIR estimation using the same method as that of obtaining the hard decision data 405. The tentative decisions 601, however, are decided at a timing earlier than the hard decision data 405 in order to follow the fluctuations in the channel characteristics.

The hard decision data 404 generated by the per-survivor processing MLSE 42 and the hard decision data 405 generated by the list-output Viterbi equalizer 43 are supplied to the selector 44.

The selector 44 selects, when the channel memory length 403 output from the channel memory length estimator 41 is-less than a predetermined value, the hard decision data 404 supplied from the per-survivor processing MLSE 42, and outputs the data as the demodulated data 406. In contrast, the selector 44 selects, when the channel memory length 403 is greater than the predetermined value, the hard decision data 405 supplied from the list-output Viterbi equalizer 43, and outputs the data as the demodulated data 406.

As described above, the present embodiment 1 selects one of the hard decision data output from the per-survivor processing MLSE and the hard decision data output from the list-output Viterbi equalizer in response to the channel memory length output from the channel memory length estimator. This makes it possible to implement a good bit error rate performance of the received signal both for the channel with large delay spread and for the channel with small delay spread and fast time-varying fading.

Embodiment 2

Figure 8:
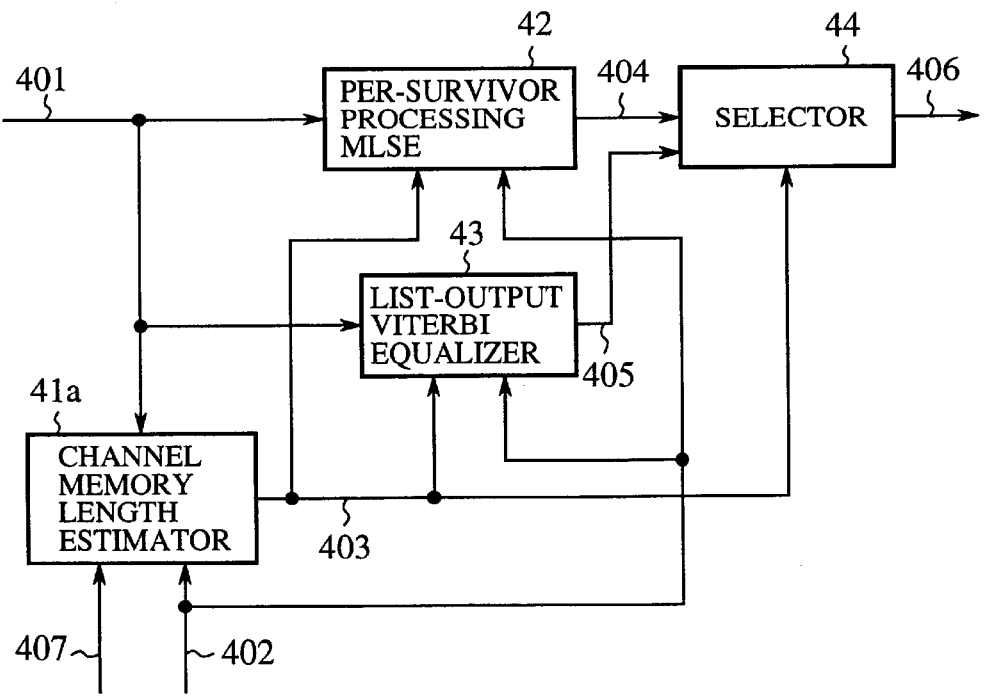
FIG. 8 is a block diagram showing a configuration of an adaptive equalizer of an embodiment 2 in accordance with the present invention.

FIG. 8 is a block diagram showing a configuration of an embodiment 2 of the adaptive equalizer in accordance with the present invention, in which the same reference numerals designate the same components as those of the foregoing embodiment 1, and the description thereof is omitted here.

In FIG. 8, the reference numeral 41a designates a channel memory length estimator for estimating the channel memory length from the probability that the correlation power exceeds a predetermined threshold; and 407 designates the threshold.

Next, the operation of the present embodiment 2 will be described.

Receiving the received baseband signal 401, known training sequence 402 and threshold 407, the channel memory length estimator 41a calculates the correlation between the received baseband signal 401 and training sequence 402 over several bursts, estimates the channel memory length 403 based on the probability that the correlation power exceeds the predetermined threshold, and outputs the results.

FIG. 9 is a block diagram showing an internal configuration of the channel memory length estimator 41a, in which the same reference numerals designate the same components as those of the adaptive equalizer of the embodiment 1, and the description thereof is omitted here.

In FIG. 9, reference numerals 54a and 56 each designate a comparator; the reference numeral 55 designates an averaging circuit; 504 designates a hard decision of the correlation power; and 505 designate the average value of the hard decisions of the correlation power.

In the channel memory length estimator 41a with this configuration, the correlator 51 calculates the correlation between the received baseband signal 401 and the known training sequence 402 like a unique word with shifting the timing of the received baseband signal 401 in the same manner as the channel memory length estimator 41 in the adaptive equalizer of the embodiment 1, and supplies the adder 52 and memory 53 with the squared correlation results as the correlation powers 501.

The adder 52 sums up the correlation powers 501 at all the timings that the correlation is obtained, and supplies the sum 502 of the correlation powers to the comparator 54a.

The memory 53 temporarily stores the correlation powers at all the timings that the correlation is obtained, and supplies the stored correlation powers 503 to the comparator 54a after the adder 502 obtains the sum 502 of the correlation powers.

The comparator 54a compares the correlation powers 503 with the sum 502 of the correlation powers, and outputs hard decisions 504 of the correlation powers, which assume "1" when the correlation powers 503 are greater than a predetermined ratio to the sum 502 of the correlation powers, and "0" otherwise.

The averaging circuit 55 averages the hard decisions 504 of the correlation powers over several bursts, and output the average 505 of the hard decisions of the correlation powers.

The comparator 56 compares the average 505 of the hard decisions of the correlation powers with the threshold 407, and outputs the timing width in which the average 505 of the hard decisions of the correlation powers is greater than the threshold 407, as the channel memory length 403.

The channel memory length 403 generated by the channel memory length estimator 41a is supplied to the per-survivor processing MLSE 42, list-output Viterbi equalizer 43 and selector 44.

The per-survivor processing MLSE 42, receiving the received baseband signal 401, channel memory length 403 output from the channel memory length estimator 41 and known training sequence 402, estimates the transmitted sequence using the maximum likelihood sequence estimation that carries out the channel estimation for respective states, and outputs the estimated results as the hard decision data 404. Since the configuration and operation of the per-survivor processing MLSE 42 are the same as those of the per-survivor processing MLSE 42 in the adaptive equalizer of the embodiment 1 as shown in FIG. 6, the description thereof is omitted here.

Receiving the received baseband signal 401, channel memory length 403 fed from the channel memory length estimator 41a and known training sequence 402, the list-output Viterbi equalizer 43 estimates the transmitted sequence using the list-output Viterbi algorithm, and outputs the estimated results as the hard decision data 405.

Since the configuration and operation of the list-output Viterbi equalizer 43 are the same as those of the list-output Viterbi equalizer 43 in the adaptive equalizer of the embodiment 1 as shown in FIG. 7, the description thereof is omitted here.

The hard decision data 404 generated by the per-survivor processing MLSE 42 and the hard decision data 405 generated by the list-output Viterbi equalizer 43 are supplied to the selector 44.

When the channel memory length 403 supplied from the channel memory length estimator 41a is less than the predetermined value, the selector 44 selects the hard decision data 404 supplied from the per-survivor processing MLSE 42, and outputs the data as the demodulated data 406. On the other hand, when the channel memory length 403 is greater than the predetermined value, the selector 44 selects the hard decision data 405 supplied from the list-output Viterbi equalizer 43, and outputs the data as the demodulated data 406.

As described above, according to the present embodiment 2, the channel memory length estimator 41a calculates the correlation between the received baseband signal and the training sequence over several bursts, and estimates the channel memory length based on the probability that the correlation power exceeds the predetermined threshold. This makes it possible to estimate the channel memory length more accurately, and can further improve the bit error rate performance as compared with the adaptive equalizer of the embodiment 1.

INDUSTRIAL APPLICABILITY

As described above, the adaptive equalizer in accordance with the present invention is applicable to the digital mobile communication, digital satellite communication and digital mobile-satellite communication, and when the digital radio communication equipment receives the radio communication signal, the selector 44 selects one of the outputs from the adaptive equalizer suitable for the channel with fast time-varying fading and from the adaptive equalizer suitable for the channel with large delay spread in response to the channel memory length supplied from the channel memory length estimator 41 in the adaptive equalizer, thereby outputting the optimum hard decision data. Thus, the adaptive equalizer in accordance with the present invention is suitable for the digital radio communication equipment to implement the good bit error rate performance of the received signal in the digital mobile telecommunication, digital satellite communication and digital mobile-satellite communication.

What is claimed is:

1. An adaptive equalizer comprising:
   a channel memory length estimator for estimating a channel memory length from a received signal;
   a first adaptive equalizer for reducing effect of intersymbol interference on the received signal using a technique suitable for a channel with a fast time-varying characteristic;
   a second adaptive equalizer for reducing effect of intersymbol interference on the received signal using a technique suitable for a channel with a large delay spread; and
   a selector for selecting, in response to the channel memory length supplied from said channel memory length estimator, one of demodulated data output from said first adaptive equalizer and from said second adaptive equalizer, and for outputting the selected demodulated data.

2. The adaptive equalizer according to claim 1, wherein said first adaptive equalizer consists of an adaptive equalizer that uses, as the technique suitable for the channel with the fast time-varying characteristic, maximum likelihood sequence estimation that carries out channel estimation for respective states to reduce the effect of the intersymbol interference on the received signal, and wherein said second adaptive equalizer consists of an adaptive equalizer that uses, as the technique suitable for the channel with the large delay spread, list-output Viterbi algorithm to reduce the effect of the intersymbol interference on the received signal.

3. The adaptive equalizer according to claim 1, wherein said channel memory length estimator receives the received signal and a known training sequence, calculates correlation between the received signal and the training sequence with shifting timing of the received signal, and estimates the channel memory length from correlation power obtained from the correlation.

4. The adaptive equalizer according to claim 2, wherein said channel memory length estimator receives the received signal and a known training sequence, calculates correlation between the received signal and the training sequence with shifting timing of the received signal, and estimates the channel memory length from correlation power obtained from the correlation.

5. The adaptive equalizer according to claim 1, wherein said channel memory length estimator receives the received signal and a known training sequence, calculates correlation between the received signal and the training sequence over several bursts with shifting timing of the received signal, and estimates the channel memory length based on probability that obtained correlation power exceeds a predetermined threshold.

6. The adaptive equalizer according to claim 2, wherein said channel memory length estimator receives the received signal and a known training sequence, calculates correlation between the received signal and the training sequence over several bursts with shifting timing of the received signal, and estimates the channel memory length based on probability that obtained correlation power exceeds a predetermined threshold.

7. An adaptive equalization scheme comprising the steps of:
   estimating with a channel memory length estimator a channel memory length from a received signal captured by receiving a radio wave radiated from digital radio communication equipment;
   reducing with a first adaptive equalizer effect of intersymbol interference on the received signal using a technique suitable for a channel with a fast time-varying characteristic;

reducing with a second adaptive equalizer effect of intersymbol interference on the received signal using a technique suitable for a channel with a large delay spread;

selecting, in response to the channel memory length, one of demodulated data output from said first adaptive equalizer and from said second adaptive equalizer; and outputting the selected demodulated data.

8. The adaptive equalization scheme according to claim 7, wherein the step of reducing with the first adaptive equalizer uses, as the technique suitable for the channel with the fast time-varying characteristic, maximum likelihood sequence estimation that carries out channel estimation for respective states to reduce the effect of the intersymbol interference on the received signal, and wherein the step of reducing with the second adaptive equalizer uses, as the technique suitable for the channel with the large delay spread, list-output Viterbi algorithm to reduce the effect of the intersymbol interference on the received signal.

9. The adaptive equalization scheme according to claim 7, wherein the step of estimating with the channel memory length estimator receives the received signal and a known training sequence, calculates correlation between the received signal and the training sequence with shifting timing of the received signal, and estimates the channel memory length from correlation power obtained from the correlation.

10. The adaptive equalization scheme according to claim 8, wherein the step of estimating with the channel memory length estimator receives the received signal and a known training sequence, calculates correlation between the received signal and the training sequence with shifting timing of the received signal, and estimates the channel memory length from correlation power obtained from the correlation.

11. The adaptive equalization scheme according to claim 7, wherein the step of estimating with the channel memory length estimator receives the received signal and a known training sequence, calculates correlation between the received signal and the training sequence over several bursts with shifting timing of the received signal, and estimates the channel memory length based on probability that obtained correlation power exceeds a predetermined threshold.

12. The adaptive equalization scheme according to claim 8, wherein the step of estimating with the channel memory length estimator receives the received signal and a known training sequence, calculates correlation between the received signal and the training sequence over several bursts with shifting timing of the received signal, and estimates the channel memory length based on probability that obtained correlation power exceeds a predetermined threshold.

\* \* \* \* \*